United States Patent
Chen

(10) Patent No.: US 7,474,260 B2
(45) Date of Patent: Jan. 6, 2009

(54) ADJUSTABLE TIME-DIVISION MULTIPLEXING RECEIVER FOR RECEIVING SATELLITE SIGNAL AND METHOD FOR THE SAME

(75) Inventor: Chun-nan Chen, Taipei (TW)

(73) Assignee: Media Tek Inc., Hsin-Chu (TW)

( * ) Notice: Subject to any disclaimer, the term of this patent is extended or adjusted under 35 U.S.C. 154(b) by 281 days.

(21) Appl. No.: 11/406,644

(22) Filed: Apr. 19, 2006

(65) Prior Publication Data

US 2007/0247356 A1     Oct. 25, 2007

(51) Int. Cl.
*G01S 5/14*     (2006.01)
*H04B 1/00*     (2006.01)

(52) U.S. Cl. .................................. 342/357.12; 375/150
(58) Field of Classification Search ............ 342/357.12, 342/357.15
See application file for complete search history.

(56) References Cited

U.S. PATENT DOCUMENTS 6,657,986 B1 * 12/2003 Laudel et al. ............... 370/342
6,748,015 B2    6/2004 Kohli et al.
2003/0174792 A1 * 9/2003 Bow et al. .................... 375/343
2007/0085736 A1 * 4/2007 Ray et al. .............. 342/357.02

FOREIGN PATENT DOCUMENTS

| EP | 1387500 | 2/2004 |
|---|---|---|
| WO | 0225829 | 3/2002 |
| WO | 0246787 | 6/2002 |

* cited by examiner

*Primary Examiner*—Gregory C Issing

(57) ABSTRACT

A satellite signal adjustable time-division multiplexing receiver for GNSS and a method for acquiring and tracking satellite signal used in the receiver. The present invention executes correlation in an adjustable time-division multiplexing and uses a clock signal with a clock rate to control speed of correlation. The clock rate can be fixed or variable. In the case that the clock rate is variable, when the speed is required to be fast (e.g. in satellite acquisition mode), the clock rate is set to be high clock rate; when the speed needs not be so fast (e.g. in signal tracking mode), the clock rate can be lower down to reduce power consumption. The adjustable time-division multiplexing is arranged for respective domains such as visible satellite, code phase, Doppler frequency and tracking accuracy according to the clock rate.

26 Claims, 4 Drawing Sheets

ADJUSTABLE TIME-DIVISION MULTIPLEXING RECEIVER FOR RECEIVING SATELLITE SIGNAL AND METHOD FOR THE SAME

TECHNICAL FIELD OF THE INVENTION

The present application relates to satellite signal receiver, more particularly, to an adjustable time-division multiplexing receiver for satellite communication and method used in the receiver.

BACKGROUND OF THE INVENTION

For a receiver detecting data loaded in spread spectrum signal transmitted in a GNSS (Global Navigation Satellite System; such as GPS, GLONASS, GALILEO system and the like), there are three domains should be considered: visible satellite ID, Doppler frequency, and code phase. In a cold start state, such as in the beginning when the receiver starts to work, the visible satellite ID, the recent Doppler frequency and the code phase are all unknown. Accordingly, it is necessary to try each possible combination of these three domains. One combination of a specific satellite ID, a specific Doppler frequency, and a specific code phase is referred to a "hypothesis". For a satellite SVx, if there are M possible Doppler frequencies DF0, DF1, ... DFm-1, and N code phases CP0, CP1, ... CPn-1 to be tried, then there are M×N hypotheses, as shown in FIG. 1. As can be deduced, when there are X satellites SV0, SV1, ..., SVx-1, the total number of hypotheses will be X×M×N, as shown in FIG. 2. In the worst case, X×M×N correlation trials should be done to acquire a specific GPS signal. In some applications, half or one fourth chip code spacing is necessary to achieve higher tracking accuracy. Therefore, an extra factor P is introduced. When the chip code spacing is half chip, P=2; when the chip code spacing is one fourth chip, P=4. The rest can be deduced accordingly. Then the total hypothesis number is X×M×N×P.

The most intuitive method is to try all the hypotheses one by one if only one correlator is available in the receiver. If two correlators are available, then two hypotheses can be tried at the same time. Accordingly, the speed can be double. As can be understood, if the speed is to be considerably lifted, a great number of correlators are needed. This causes increases in cost and hardware complexity.

For a GPS signal, the chipping rate of pseudo-random code is 1.023 MHz, and the period thereof is 1023 chips, which is 1 millisecond. Therefore, a correlator having 1023 pairs of a multiplier and an adder is needed to correlate the received signal if the clock rate of the correlator is only 1 kHz. The searching rate is one hypothesis per millisecond. However, such a correlator, which has 1023 pairs of a multiplier and an adder, is too complex and the clock rate of 1 kHz is too slow in practice. The scale of the correlator can be reduced by increasing the clock rate to achieve the same effect. For example, if 33 kHz clock rate is used, than only 31 pairs of a multiplier and an adder are required.

As described above, the hardware complexity can be reduced by increasing the clock rate, but the hypothesis searching rate is still one hypothesis per millisecond. There are 1023 hypotheses in code phase domain for a specific satellite and a specific Doppler frequency. If the clock rate is further raised to 33 kHz×1023=33.759 MHz, then all code phase hypotheses for the satellite and the specific Doppler frequency can be tried in one millisecond. In some applications, higher accuracy is required, so that half chip spacing, for example, is necessary. Then there are 2046 hypotheses are to be tried in the code phase domain for a specific satellite and a specific Doppler frequency. Accordingly, the clock rate can be further raised to 33.759 MHz×2=67.518 MHz, and 2046 hypotheses are tried in one millisecond. As the clock rate increasing, additional memory capacity is required. However, this is not a big problem because memory is low-cost in comparison with multiplier or adder. In addition to increasing clock rate, it is necessary to properly arrange multiplexing of the searching capability for the respective domains so as to be adapted to various application conditions.

SUMMERY OF THE INVENTION

An objective of the present invention is to provide a satellite signal adjustable time-division multiplexing receiver for GNSS. The receiver of the present invention tries hypotheses in an adjustable time-division multiplexing. The receiver uses a clock signal with a clock rate to control speed of trying hypotheses. The adjustable time-division multiplexing executed in the receiver is arranged for respective domains such as visible satellite domain, code phase domain, Doppler frequency domain and tracking accuracy domain according to the clock rate. In one embodiment, the clock rate is fixed. The time-division multiplexing is arranged for respective domains based on the fixed clock rate. In another embodiment, the clock rate is variable. When the speed is required to be fast (e.g. in satellite acquisition mode), the clock rate is set to be a high clock rate. When the speed needs not be so fast (e.g. in signal tracking mode), the clock rate can be lower down to reduce power consumption.

Another objective of the present invention is to provide a method for acquiring and tracking satellite signal. By using the method in accordance with the present invention, the time-division multiplexing of correlation can be arranged in the most appropriate way. In addition, the speed of trying hypotheses can be adaptively controlled as desired.

In accordance with the present invention, the receiver includes a clock controller providing a clock signal with a clock rate; and a corrlelator executing correlation to an input signal at a speed determined by the clock rate, the correlator operating in an adjustable time-division multiplexing, which is arranged for respective domains according to the clock rate. The clock rate can be fixed or variable.

In accordance with the present invention, a processing method for a GNSS (Global Navigation Satellite System) signal comprising steps of providing a clock signal with a clock rate; executing correlation to the GNSS signal in an adjustable time-division multiplexing at a speed determined by the clock rate. The clock rate can be fixed. Alternatively, the correlation speed can be changed by varying the clock rate. In either case, the multiplexing of correlation is arranged for respective domains based on the clock rate.

The present invention may accomplish excellent balance among searching speed, tracking accuracy, and power consumption. In addition, hardware complexity is also taken into consideration. Accordingly, the present invention can acquire and track the satellite signal in an extremely efficient manner.

DETAILED DESCRIPTION OF THE INVENTION

Figure 1:
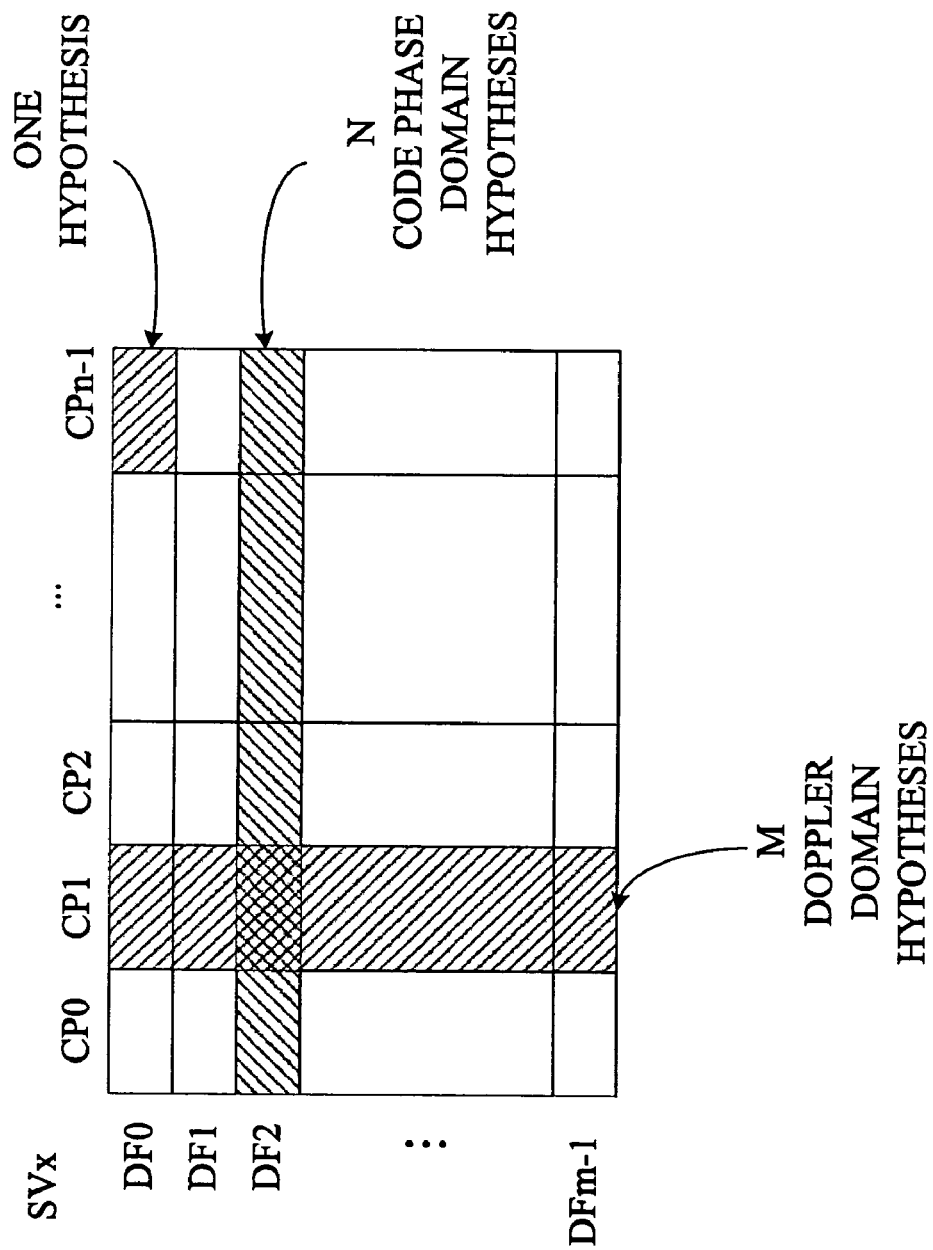
FIG. 1 schematically shows hypotheses in code phase domain and Doppler frequency domain for a specific satellite.
Figure 2:
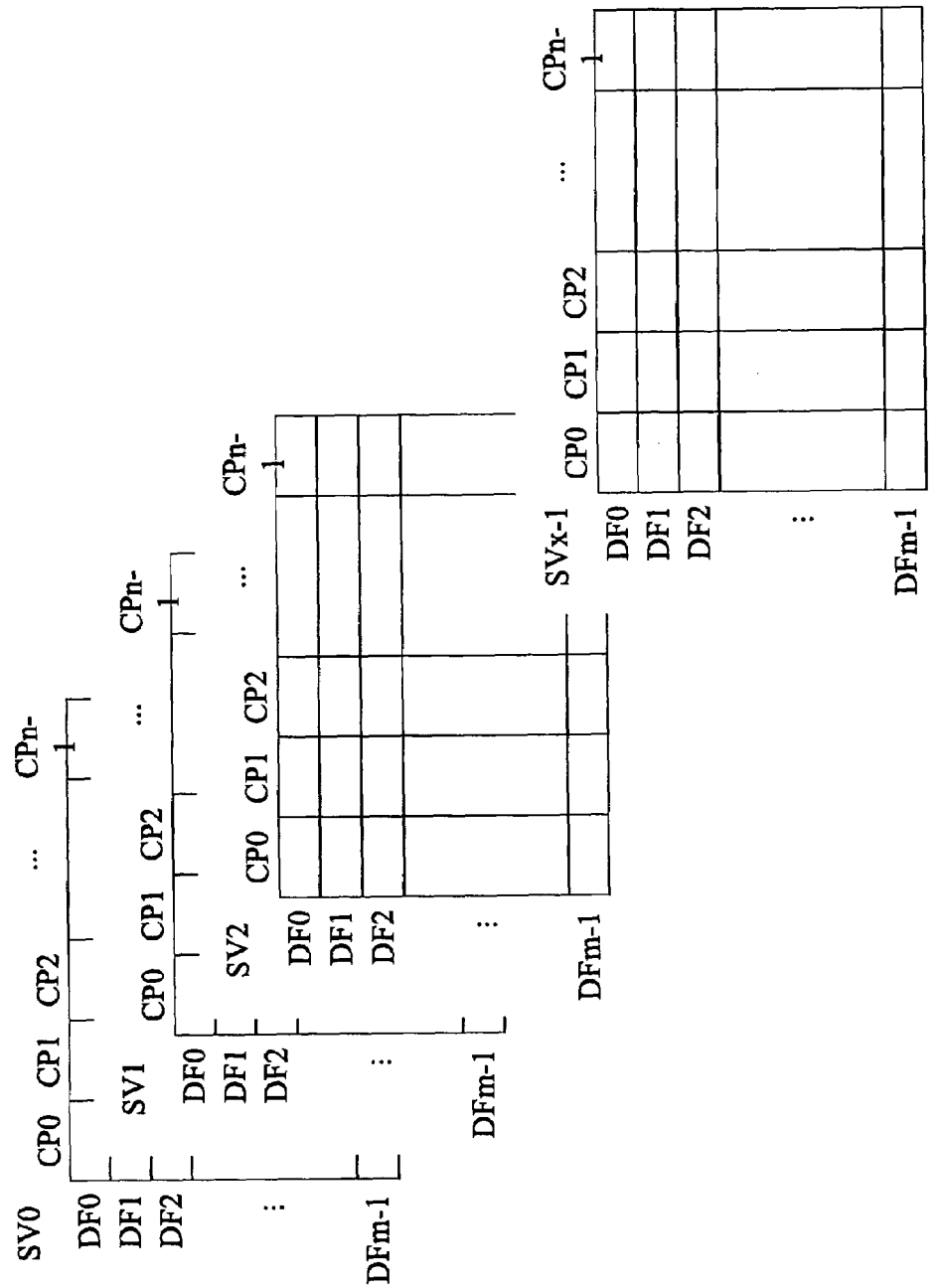
FIG. 2 schematically shows hypotheses in code phase domain and Doppler frequency domain for available satellites.

The present invention will be described in detail in conjunction with the appending drawings. As described, total hypothesis trial number for a time-division multiplexing receiver is X×M×N×P. Suppose that a clock rate is K multiples of the hardware multiplexing rate, (e.g. 33 kHz for the correlator has 31 pairs of multiplier and adder). An equation of multiplexing is as follows:

$$K >= X \times M \times N \times P \quad (1)$$

Where M is the hypotheses number to be tried in Doppler frequency domain, N is the hypotheses number to be tried in code phase domain. P indicates the accuracy can be achieved. As mentioned, P=2 indicates that the accuracy is ½ chip, P=4 indicates that the accuracy is ¼ chip. X indicates the satellite number can be tried.

In a first embodiment of the present invention, K is fixed. The time-division multiplexing of the receiver for trying the hypotheses is adaptively arranged based on the fix clock rate. For example, if K=2046, which means 2046 hypotheses are tried in one millisecond. The multiplexing for K could be distributed as 1×1×1023×2. That is, in one millisecond, 1023 code phase hypotheses for a specific satellite and a specific Doppler frequency are tried with an accuracy of ½ chip. In some cases, the code phase range is known. Therefore, it is not necessary to try all the hypotheses in the code phase domain. Accordingly, the multiplexing of K can be 1×3×341×2. That is, in one millisecond, 682 half-chip code phase trials at three different Doppler frequencies for a specific satellite are done.

After the satellite signal is acquired, and the process enters signal tracking. In this condition, the code phase is locked. At this time, it does not need to search so many code phase hypotheses. Then the multiplexing of K can be 11×3×15×4. That is, in one millisecond, 11 satellites are searched. For each satellite, hypotheses for three different Doppler frequencies, 15 code phase candidates are done with ¼ chip accuracy. As described, the multiplexing for the hypotheses can be properly distributed to be adaptable for the application mode under the fixed clock rate. Such a manner is referred to as "fix-rate-adaptive-domain".

However, in practice, sometimes there is no need to search a range of 15 hypotheses in code phase domain, and there is no need to search at three different Doppler frequencies. In addition, sometimes it is not necessary to search so many satellites. If such unnecessary trials can be omitted, then power consumption of the receiver can be significantly reduced.

In another embodiment of the present invention, K is variable. The clock rate is changed for different mode. For example, in satellite searching mode, the receiver needs to acquire satellites as soon as possible. Therefore, a higher clock rate is recommended. In satellite tracking mode, a lower clock rate can be used to reduce power consumption. Such a manner is referred to as "adaptive-rate-adaptive-domain". The details will be further described later.

Figure 3:
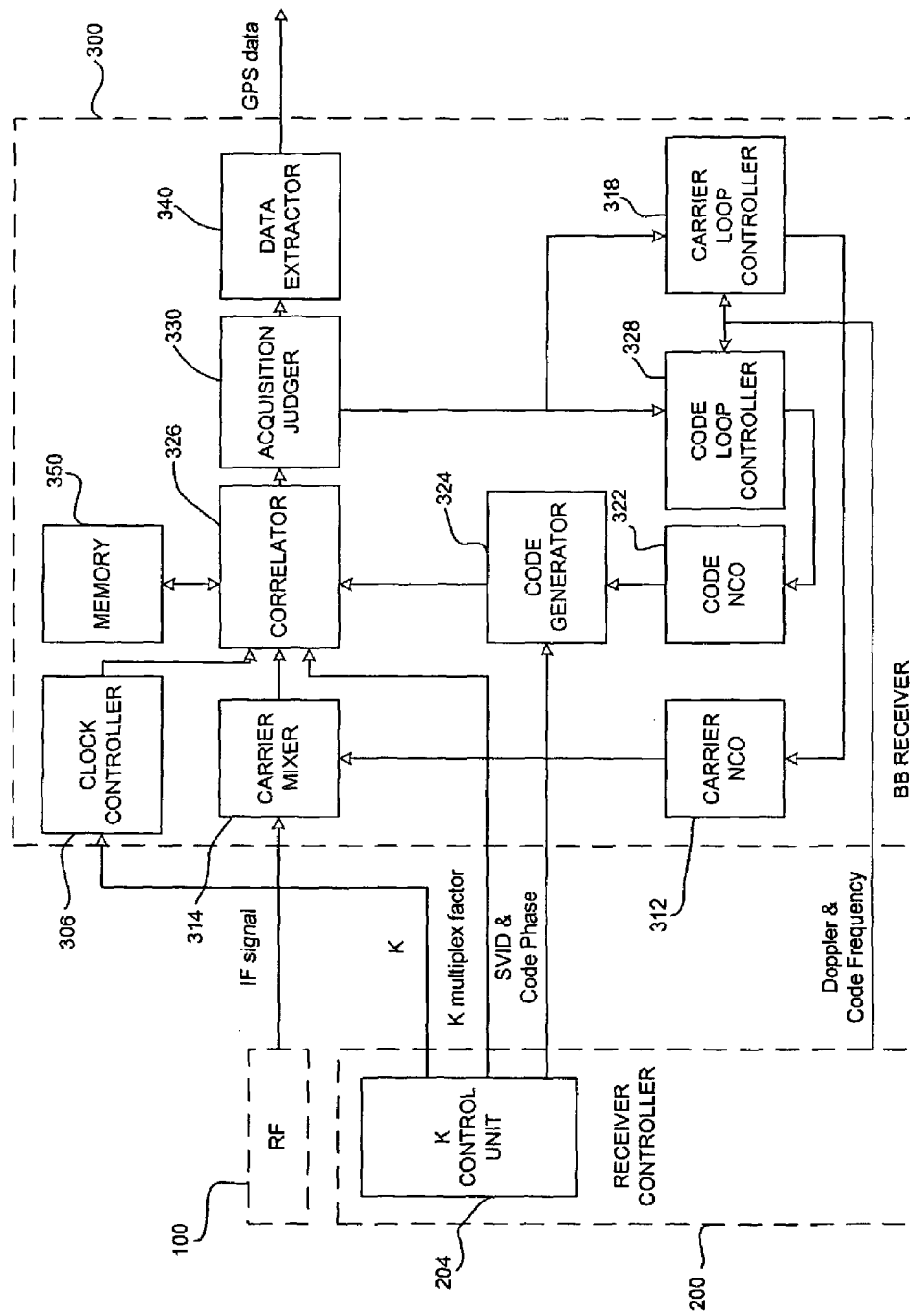
FIG. 3 is a block diagram showing a GNSS receiver in accordance with the present invention.
Figure 4:
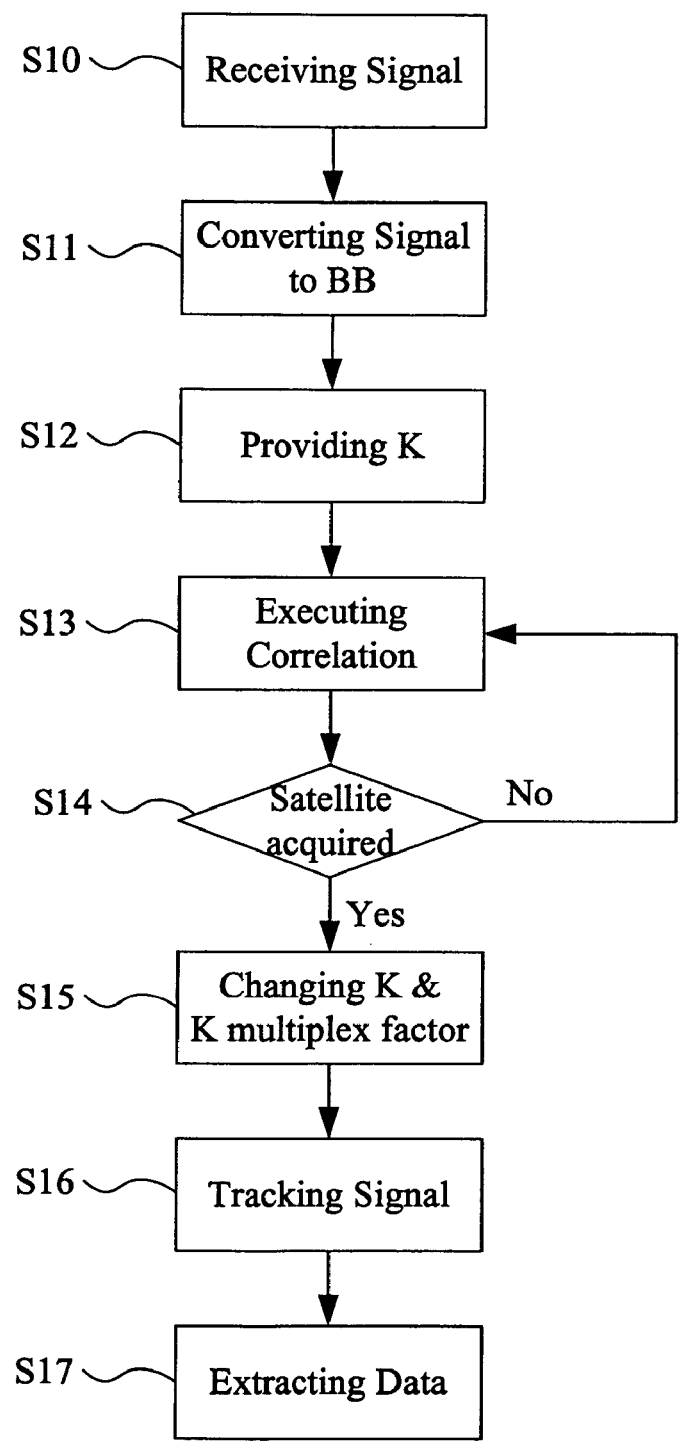
FIG. 4 is flow chart showing a method of an embodiment in accordance with the present invention.

FIG. 3 is a block diagram showing a structure of a GNSS receiving device, which comprises a baseband receiver in accordance with the present invention. FIG. 4 is flow chart showing a method of the latter embodiment in accordance with the present invention. As shown, the receiving device includes an RF receiver 100, in which all RF related processes are done, a receiver controller 200 and a baseband (BB) receiver 300. The RF receiver 100 receives a GNSS (e.g. GPS) signal (Step S10), which is spread coded, and converts the signal to an intermediate frequency (IF) signal. The IF signal is output to the baseband receiver 300. The operations thereof will be described in detail later.

The IF signal is transmitted to a carrier mixer 314 of the baseband receiver 300. The carrier mixer 314 mixes the IF signal with a carrier signal generated from a carrier NCO (numerical controlled oscillator) 312 to convert the IF signal to a baseband signal (Step S11). A code generator 324 using a code clock generated by a code NCO 322 to generate pseudo-random noise (PN) code signal. A clock signal with a clock rate K is provided (Step S12). A correlator 326 executes correlation to the signal (Step S13) according to the clock signal. Although in FIG. 4, the provision of K is indicated by Step S12, it can be a resident operation in the receiver. The correlator 326, which comprises a code mixer (not shown) and an accumulator (not shown), mixes the baseband signal with the PN code signal to dispread the spread coded signal and integrates the mixed result. That is, the correlator 326 executed correlation to the baseband signal. Before correlation, the correlator 326 receives an instruction concerning the distribution of K, which has been introduced above, and executes correlation according to the instruction. This instruction, which is referred to K multiplex factor, is issued by a K control unit 204. The K multiplex factor will be further described later. This K control unit 204 can be built in the receiver controller 200 or externally provided in a hardware, firmware or software form. In the present embodiment, the K control unit 204 is set in the receiver controller 200. The integrated result of the correlator 326 is stored in a memory 350. An acquisition judger 330 determines if an acquisition is achieved according to the output of the correlator 326 (Step S14). If the acquisition is achieved, the acquisition judger 330 starts signal tracking. Since the searching speed is not necessary to be so fast in the tracking mode, the clock rate K can be lowered down. In addition, the ranges of code phase domain and Doppler frequency domains can be narrowed in the tracking mode. Accordingly, the K multiplex factor can be changed to adjust the time-division multiplexing of the correlator 326 (Step S15). The acquisition judger 330 feeds back signals to adjust the carrier NCO 312 and code NCO 322 via a carrier loop controller 318 and a code loop controller 328, respectively, so as to track the signal in code phase domain and Doppler frequency domain (Step S16). A data extractor 340 is used for extracting data of input signal according to the output of the correlator 326 (Step S17).

The baseband receiver 300 further has a clock controller 306. The clock controller 306 provides the clock with the clock rate K. The clock rate can be fixed or variable. In the case that the clock rate is variable, the clock controller 306 receives a command concerning K value provided by the K control unit 204 to control the clock rate and accordingly the operation speed of the correlator 326.

When the operation mode of the receiver is changed, (e.g. the process enters satellite tracking mode from satellite acquiring mode), the K multiplex factor should be changed to adaptively adjust the time-division multiplexing of the correlator 326. More preferably, the clock rate is also changed, that is, K is changed. In this example, the clock rate K is changed to a lower value when the process enters into signal tracking stage from signal acquisition stage. As mentioned, in satellite searching mode, a higher speed is preferred. Accordingly, a higher clock rate $K_H$ is appropriate. After acquisition, the receiver is to stably track the observable satellites and to save power consumption as much as possible. Accordingly, a lower clock rate $K_L$ is more suitable for this condition.

The higher clock rate $K_H$ used in searching mode can be 2046 as the previous example described in the background to provide a multiplexing such as 1×2×1023×1, or even 4092 to provide a multiplexing as 2×1×1023×2. For tracking mode, the clock rate K can be lowered down to $K_L$, which can be 200 to provide a multiplexing of 11×1×5×4, since it is not necessary to try so many hypotheses in code phase domain, and the Doppler frequency should be known in tracking mode. The clock rate $K_L$ can adaptively vary according to the number of satellites that are being tracked. For example, if there are eight satellites are being tracked, the $K_L$ can be lowered down to 160 to provide a multiplexing of 8×1×5×4. Similarly, if there are only five satellites are being tracked, the $K_L$ can be further lowered down to 100 to provide a multiplexing of 5×1×5×4. The instruction to indicate various multiplexing arrangements of K is the K multiplex factor passed to the correlator 326. By adaptively varying the clock rate, the power consumption can be significantly reduced. In the mean while, when high clock rate is required to achieve rapid searching, for example, the present invention can also satisfy such a need.

The process for the embodiment in which K is fixed is similar to that shown in FIG. 4. It is noted that only K multiplex factor is changed in step S15 in this case.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A receiver for a GNSS (Global Navigation Satellite System) comprising:
   a clock controller providing a clock signal with a clock rate; and
   a corrlelator correlating an input signal with a code signal for a plurality of hypotheses, each of which is defined by a combination of a specific satellite, a specific Doppler frequency and a specific code phase, at a speed determined by the clock rate in an adjustable time-division multiplexing scheme and adjusting a multiplexing arrangement of the time-division multiplexing scheme for the hypotheses based on the clock rate.

2. The receiver of claim 1, wherein the clock controller provides the clock signal with a fixed clock rate.

3. The receiver of claim 1, wherein the clock controller provides the clock signal with a variable clock rate.

4. The receiver of claim 3, wherein the clock controller provides the clock signal with a clock rate which is changed when operation mode of the receiver is changed.

5. The receiver of claim 4, wherein the clock controller sets the clock rate of the clock signal to be a high clock rate when the receiver operates in a satellite acquiring mode.

6. The receiver of claim 4, wherein the clock controller sets the clock rate of the clock signal to be a low clock rate when the receiver operates in a satellite tracking mode.

7. The receiver of claim 1, wherein the clock controller receives a command signal to control the clock rate of the clock signal accordingly.

8. The receiver of claim 1, wherein the correlator receives a command signal to determine the multiplexing arrangement for the adjustable time-division multiplexing scheme accordingly.

9. The receiver of claim 1, wherein the correlator adjusts the multiplexing arrangement for the adjustable time-division multiplexing scheme when an operation mode of the receiver is changed.

10. The receiver of claim 1, wherein the correlator determines the multiplexing arrangement for the adjustable time-division multiplexing scheme depending on the code phase range to be searched by the receiver.

11. The receiver of claim 1, wherein the correlator determines the multiplexing arrangement for the adjustable time-division multiplexing scheme depending on Doppler frequency range to be searched by the receiver.

12. The receiver of claim 1, wherein the correlator determines the multiplexing arrangement for the adjustable time-division multiplexing scheme depending on satellite number to be searched by the receiver.

13. The receiver of claim 1, wherein the correlator determines the multiplexing arrangement for the adjustable time-division multiplexing scheme depending on tracking accuracy by the receiver.

14. The receiver of claim 1, further comprising a receiver controller controlling the multiplexing arrangement for the adjustable time-division multiplexing scheme of the correlator.

15. The receiver of claim 14, the receiver controller further instructs the clock controller to control the clock rate.

16. A processing method for a GNSS (Global Navigation Satellite System) signal, the method comprising steps of:
   providing a clock signal with a clock rate;
   executing correlation between the GNSS signal and a code signal for a plurality of hypotheses, each of which is defined by a combination of a specific satellite, a specific Doppler frequency and a specific code phase at a speed determined by the clock rate in an adjustable time-division multiplexing scheme, a multiplexing arrangement of the adjustable time-division multiplexing scheme being determined for the hypotheses based on the clock rate.

17. The method of claim 16, wherein the clock rate is fixed.

18. The method of claim 16, wherein the clock rate is variable.

19. The method of claim 18, wherein the clock rate is changed when an operation mode of the correlation is changed.

20. The method of claim 19, wherein the clock rate is set to be a high clock rate when the correlation operates in a satellite acquiring mode.

21. The method of claim 19, wherein the clock rate is set to be a low clock rate when the correlation operates in a satellite tracking mode.

22. The method of claim 16, wherein the multiplexing arrangement for the adjustable time-division multiplexing is adjusted when an operation mode of correlation is changed.

23. The method of claim 16, wherein the multiplexing arrangement for the adjustable time-division multiplexing scheme is determined depending on code phase range to be searched.

24. The method of claim 16, wherein the multiplexing arrangement for the adjustable time-division multiplexing scheme is determined depending on Doppler frequency range to be searched.

25. The method of claim 16, wherein the multiplexing arrangement for the adjustable time-division multiplexing is determined depending on the satellite number to be searched.

26. The method of claim 16, wherein the multiplexing arrangement for the adjustable time-division multiplexing is determined depending on tracking accuracy.

* * * * *